3,243,299
MONOGASTRIC FEED CONCENTRATE CONTAINING RUMEN MICROORGANISMS AND LACTIC FERMENT AND PROCESS OF PREPARATION
Joaquin Péna Mecho, Lisbon, Portugal, and Enrique Gonzalez Sicilia, Sevilla, Spain, assignors to Pronit Internacional, S.A., Jerez de la Frontera (Cadiz), Spain, a corporation of Spain
No Drawing. Filed June 5, 1963, Ser. No. 286,137
Claims priority, application Great Britain, Sept. 26, 1961, 34,404/61
13 Claims. (Cl. 99—2)

This application is a continuation-in-part of application Serial No. 147,394, filed October 11, 1961, now abandoned.

This invention relates to new and improved feed compositions for monogastric animals and to a novel method for their preparation. More particularly, the invention concerns a novel feed composition including a microflora occurring in the gastric systems of ruminant animals and which is adapted to be fed to monogastric animals.

Much effort has been devoted in recent years to the study of the nutritional needs of monogastric animals, such as pigs and poultry, one result of which has been the recognition of the importance of proteins in the diet of these animals in order to promote the development and production of good quality meat. In this connection, emphasis has been laid on the utilization of animal rather than vegetable protein, and this has led to a continual increase in feed preparations based on meat and fish waste to be incorporated in the total feed of the monogastrics.

A preferred additive has been fish meal which, if properly prepared, has an animal protein content of about 65%, and the assimilation of which by monogastrics takes place readily where the animal protein material constitutes say 10 to 15% of the total feed. However, such meals, and especially the fish meals, possess two disadvantages: (1) they impart a disagreeable flavor to the meat, necessitating their elimination from the feed well in advance of slaughter, and (2) in the course of manufacture and drying at high temperatures, a large percentage of the proteins is destroyed with attendant loss of corresponding nutritional values.

Changing concepts of general protein requirements of monogastrics and other animals have led to recognition of the importance of amino acids themselves, rather than the source from which they are derived, in the growth, development and nutrition of the animals. Thus, there are two aspects to the protein requirements of the animal: (1) a nonspecific nitrogen minimum (total nitrogen), and (2) a specific nitrogen minimum (amino acids). The latter is of greater importance and decides the true biological value of a protein since the protein may be sufficient for supplying the total nitrogen, but may be at the same time deficient in a specific sense since it lacks one or more essential amino acids. Although proteins of animal origin are, in general, superior, in their content of amino acids, nevertheless, the vegetable proteins, such as soya bean, corn, and the like, can provide an effective source of the necessary amino acids and in amounts sufficient to surpass known minimal requirements, while avoiding the disadvantages of animal protein sources.

The foregoing relates to nitrogen in the protein state, and in the manufacture of feeds, animal nutrition has been based largely on the concept of incorporating such nitrogen in the feed. However, more recently, attention has been given by workers in this field to the inclusion in feeds, particularly ruminant animal feeds, of nonprotein nitrogen compounds, such as, for example, ammonia, ammonium salts, and urea.

It is known that there are present in the rumen, and also in the reticulum, of ruminant animals, microflora, such as bacteria, protozoa, and yeasts, which are individually capable of converting vegetable proteins to amino acids, and of converting nonprotein nitrogen into proteins. These microflora are also capable of digesting cellulose feeds.

It has been proposed in the prior art to employ as feed supplements for ruminants, viable rumen organisms in desiccated form, and a method for the preparation of such supplements is described in U.S. Patent 2,700,611. It has also been proposed to combine with nonprotein nitrogen and cellulose in ruminant feed compositions, naturally or artificially grown rumen microorganisms, as disclosed in U.S. Patent 2,560,830. However, such ruminant feed preparations are unsuitable for feeding monogastric animals for the reason that the rumen microflora which they contain are promplty destroyed by the high concentrations of hydrochloric normally present in the gastric systems of monogastric animals. U.S. Patent 2,738,273 suggests the isolation of rumen microorganisms, followed by addition thereto of milk and ascorbic acid, and freeze-drying to preserve the microorganisms for medicinal administration to ruminants; and suggests further that the rumen microorganisms may be used to digest cellulose and produce amino acids and vitamins by predigestion in fermentation vats to provide a feed for ruminants.

However, none of the foregoing patents discloses or teaches any solution to the problem of obtaining a preparation of the microflora of the rumen and the reticulum of ruminants which is capable of being fed to monogastric animals.

Accordingly, it is an object of the present invention to provide a preparation of the microflora of the rumen and the reticulum of ruminant animals which is capable of being fed to monogastric animals and which will not be adversely affected by the stomach acidity of monogastric animals.

It is a further object of the invention to provide a novel preparation of said microflora which will function in the gastric systems of monogastric animals to enable them to digest cellulosic feeds and to derive nutrition therefrom.

It is a still further object of the invention to provide a microflora preparation which is capable of incorporation with feeds for monogastric animals, particularly in conjunction with vegetable protein sources, and which will enhance the utilization of vegetable proteins with benefit to the animal.

These and other objects will become apparent as the ensuing description of the novel method and compositions of the invention proceeds.

The hitherto unsolved problem of providing a preparation of the rumen microflora which will survive and thrive under the acidity of the gastric systems of monogastric animals, in which the pH ranges from about 4.5 to 5.0, has been solved by the present invention. It is known that these microflora normally live in an environment in which the pH ranges between 6.8 and 7.2.

In accordance with one aspect of the invention, it has been found that the microflora of the rumen and reticulum of ruminants can be made to continue to live and to multiply in an environment with a pH between 4.5 and 5.0 by isolating said microflora and incorporating with the living microflora a quanity of a lactic ferment sufficient to protect the microflora against the acidity of the monogastric stomach, namely a pH between about 4.5 and 5.0. By lactic ferment is meant a preparation, preferably in dry powder form, of acidophile bacilli of a type which are resistant to and capable of growth in an environment having a pH between about 4.5 and 5.0, i.e. which are capable of growth in monogastrics. These organisms include, for example, lactic acid bacteria of the *Lactobacillus bulgaricus*, and *Lactobacillus acidophilus* types.

It has been found, surprisingly and unexpectedly, that the presence of these lactic ferments not only serves to protect the rumen microflora against injury at the pH of 4.5–5.0, but that it promotes the growth of these microflora, facilitates their function of producing amino acids from proteins, and of digesting cellulosic feed ingredients. At the same time, the lactic ferments produce lactic acid which is beneficial to the growth of the microflora and which prevents the development of pathogenic organisms. The amount of lactic ferment employed in relation to the quantity of microflora is not critical, but will depend upon the activity of the microflora. It may range, for example, from about 1% to about 20% by weight of the microflora.

In accordance with another aspect of the invention, it has been found that a feed component or additive may be prepared which contains as its active ingredient the rumen microflora, protected as described by the lactic ferment, which may be associated with vegetable protein materials to provide a feed concentrate. It has been found that this not only makes possible the substitution of the hitherto used animal proteins to a major extent, but that the microflora, in the monogastrics, enhances the absorption and utilization of the vegetable proteins, for example, by promoting the formation of valuable amino acids from the vegetable proteins. Thus, for example, it is found that methionine, which is present only in minute amounts in the original vegetable protein, appears in the digestive system of the monogastric in considerable quantities as the result of the action of the rumen microflora under the conditions prevailing in the monogastric stomach.

In accordance with still another aspect of the invention, the microflora preparation obtained from rumen and reticulum, and protected as described when incorporated in feed for monogastrics, such as pigs and poultry, makes possible the utilization of cellulosic feed ingredients, in a manner similar to that of ruminants. Thus, the monogastrics are enabled to digest the cellulose and to utilize its conversion products, such as the various sugars, to aid in total nutrition.

In the preparation of the living rumen and reticulum microflora feed additive compositions of the invention, there are first obtained from abbatoirs and the like, the contents of the rumen, or first stomach, and also the contents of the reticulum, or second stomach, of ruminants, such as, for example, bovine animals, sheep or goats. The rumen provides a mixture of various anaerobic microorganisms. The reticulum, where some of the rumen organisms have been destroyed, for example, the ciliates, may provide a somewhat different array of microorganisms, as well as some nutritional factors such as vitamins. The ciliate protozoa possess cellulose digestive capability.

The stomach contents, containing the microflora, are withdrawn using conventional techniques and avoidance of contamination, and are transferred to a mixing tank, and sufficient bran is added to permit about 60% of moisture to remain in the contents. Toluene may be added as a preservative. The method of treatment of the rumen and reticulum contents described below is intended to illustrate a preferred procedure, but is not to be regarded as limiting.

In order to promote direct reproduction of the rumen and/or reticulum contents microorganisms on the bran, the mixture is cultured for about 24 hours at room temperature. A small proportion of the fermented mix is then employed to inoculate a cultural broth, and the remainder of the mix is dried as described below.

The culture portion of the mix is cultured under anaerobic conditions using any suitable broth customarily employed for growing microorganisms or yeasts, and which contains nitrogen, carbohydrates and minerals. Thus, there may be used a broth made from 500 grams of lean minced beef soaked in water, to which is added 1% of Witte's peptone, and 0.5% sodium chloride; glucose, tryptone, and potassium acid phosphate may also be added. The broth may also include molasses, urea or ammonium salts, and a substrate such as sawdust. The pH is maintained between about 6.8 and 7.2 to simulate conditions in the rumen. Culture takes place at a temperature between about 35° and 40° C., preferably at 35° C. for 24 to 48 hours, whereupon the broth is centrifuged to lower its moisture content to about 30 to 40% by weight, and to provide a product comprising live microflora and sawdust residue.

The remainder of the rumen contents-bran mixture previously described is divided into three parts which, for convenience, may be three equal parts. The first portion is dried under vacuum at a temperature between about 35° and 40° C. to obtain a product comprising live microflora and having a moisture content of about 10% to 12%. The drying should take the shortest possible time, 3 to 6 hours, and the degree of vacuum need be only slight, for example, about 50 mm. of vacuum.

The second portion is dried at a temperature between about 50° and about 57° C., preferably at 55° C. at atmospheric pressure, for a period of approximately 8 hours. Under these conditions, bacteria are destroyed and autolyzation takes place, yielding a meal containing about 6% moisture which is rich in enzymes of the rumen microflora, such as, for example, aminases, proteases, cellulases, and hemicellulases.

The third portion is dried at about 70° C. for about 1 hour, the object being to obtain spores of the rumen bacteria. These, by a process of natural selection, will be the stronger spores, which are capable of reproduction and retain more activity. The portion is dried to about 5% moisture content.

It will be understood that the relative amounts of the aforesaid three portions may be varied as desired, and that the conditions set forth may also be subject to considerable variation, depending upon the type of organisms and other process conditions. The rumen contents and the reticulum contents may be treated separately as desired.

The foregoing materials are admixed to provide a preparation containing live rumen and/or reticulum organisms as the active ingredient thereof, and containing about 10% moisture.

To the mixture of microflora and dried materials there is added a suitable amount of lactic ferment, as previously described. There is also added yeast, preferably brewers yeast (Saccharomyces) to aid in the growth of the microflora and to give volume to the preparation, and to aid in the synthesis of proteins and vitamins in the monogastric animal. There also are added small amounts of mineral nutrients, including potassium iodide, sulfur (in the form of flowers of sulfur) and cobalt sulfate.

The preparation may also include placenta material derived from any mammal, e.g. hog or sheep embryos, fish roe, chicken embryos, and the like, wheat germ, and other cereal germ, which acts as a biocatalyzer in the feed. Thus, there may be employed cow placenta, comminuted at 55° C., dried for 8 hours at 55° C. and dried, as an agent for promoting autolyzation.

The aforementioned ingredients are admixed in the following approximate ranges of proportions, to provide a feed additive in accordance with the invention:

| | Percent, by weight |
|---|---|
| Rumen and/or reticulum microflora | 5 to 50 |
| Yeast | 49 to 94 |
| Lactic ferments | 1 to 10 |
| Potassium iodide, 50% solution | trace |
| Sulfur | trace |
| Cobalt sulfate | trace |
| Total, about | 100 |

A preferred formula, but one which is not to be considered as limiting, is one in which the content of microflora is 10%, yeast 88%, lactic ferments 2%, all by weight.

A product of high biological value to be incorporated in diets and feeds for monogastrics of every kind, characterized in that it contains:

| | |
|---|---|
| Rumen microorganisms containing 8 to 12% of moisture | 4 to 10 kg. |
| Reticulum microorganisms, 8 to 12% of moisture | 2 to 8 kg. |
| Dried yeast | 10 to 40 kg. |
| Top yeast, 8 to 12% of moisture | 50 to 80 kg. |
| Lactic ferments | 300 to 2,000 grams. |
| Potassium iodide, 50% solution | 5 to 30 grams. |
| Sulphur in the form of salt | 5 to 20 grams. |
| Soluble cobalt with a Co content of | 1 to 6 grams. |
| Triturated placenta dried until it contains 10% of moisture | 2 to 8 kg. |

The procedure of the invention may be illustrated by the following example, which is not to be regarded as limiting.

*Example 1*

500 kg. of the contents of the rumen and the reticulum of a freshly slain cow were extracted, and treated as described previously, by culturing with bran for 24 hours, removing a small portion for further broth culture, dividing the remainder of the bran mixture into three equal portions. The broth was cultured for 36 hours at pH 7 and at 35° C., and the broth was centrifuged and the product set aside. The first portion of bran mixture was dried at 50 mm. vacuum at 37° C. for 3 hours. The second portion was dried at 55° C. for 8 hours at atmospheric pressure. The third portion was dried at 70° C. for 1 hour. The dried portions and the culture were admixed with lactic fement, and yeast, and mineral materials, to yield a product having the following formula:

| | |
|---|---|
| Rumen and reticulum microorganisms kg | 50 |
| Top yeast containing max. 12% moisture kg | 350 |
| Dried yeast kg | 100 |
| Lactic ferments in powder form kg | 1 |
| Potassium iodide, 50% solution grams | 20 |
| Sulfur do | 10 |
| Cobalt sulfate do | 2.5 |

The foregoing microflora preparations are suitable as additives for admixture with vegetable protein materials, other nitrogenous materials and mineral ingredients, to provide feed concentrates. The feed concentrates may, in turn, be further admixed with corn, oats, and cellulosic feed ingredients to provide a feed composition suitable for feeding monogastrics.

In the concentrates, the additive described above will be designated for convenience by its trademark "Pronit"; and in the formulas for particular concentrates, it will be understood that the formula disclosed in Example 1 is employed.

It will be seen from the formulas of the respective concentrates that animal proteins, such as fish meal, have been completely replaced by vegetable proteins. The Pronit increases the utilization of the vegetable proteins and makes possible to a limited extent, the assimilation of the urea, converting nonprotein nitrogen into assimilable protein within the stomach of the monogastric.

Typical formulas of concentrates prepared in accordance with the invention include the following:

FORMULA 1 CONCENTRATE

| | Percent |
|---|---|
| Soya or other plants with vegetable protein | 66.25 |
| Urea | 12.50 |
| Pure Pronit | 2.50 |
| Dicalcium phosphate | 11.25 |
| Calcium carbonate | 5.00 |
| Fats | 2.50 |
| | 100.00 |

FORMULA 2 CONCENTRATE

| | Percent |
|---|---|
| Soya | 57.5 |
| Pronit | 12.5 |
| Urea | 12.5 |
| Minerals | 17.5 |
| | 100.00 |

Another formula has also been used for chickens, the urea being substituted by sand and, as control for both formulas, there was used a specially compounded feed chosen from among the most suitable ones on the market and containing 10% of fish meal.

A third formula has been arranged for a content of 1% of urea in the total feed compounded, in view of the existence of countries where the said percentage is permitted as a maximum.

FORMULA 3 CONCENTRATE

| | Percent |
|---|---|
| Soya | 68.75 |
| Urea (45/46% N.) | 10.00 |
| Pure Pronit | 2.50 |
| Dicalcium phosphate | 11.25 |
| Calcium carbonate | 5.00 |
| Animal fat | 2.50 |
| | 100.00 |

It is important to note that soya is the preferred meal, but it is possible to employ peanut, cottonseed flour, sesame flour, etc. and any vegetable protein meal or flour.

Three batches of chickens consisting of 25 units per batch were formed and were fed in exactly equal amounts by weight. At the end of exactly eight weeks, the average increase in weight for each batch was as follows:

| | Grams |
|---|---|
| Feed containing fish meal | 1042.91 |
| Feed containing Pronit and urea | 1029.22 |
| Feed containing Pronit and sand | 1019.94 |

As will be observed, the increase in weight is the same for practical purposes, but the formula containing Pronit and urea is naturally much cheaper than that containing fish meal; the most interesting thing, however, is the consumption of albumen per kilogram of increase in weight, as follows:

|   | kg. |
|---|---|
| First group, fed with a feed containing fish meal | 0.536 |
| Second group, Pronit plus urea | 0.432 |
| Third group, Pronit plus sand | 0.448 |

This higher value of Pronit as a producer of protein material in the bodies of animals can be attributed:

(1) To the action of enzymes produced by the Pronit;
(2) To the increase in the biological value of the vegetable proteins in the feed by the microflora of the Pronit.

This result of the activity of Pronit could not be foreseen and is of very great importance.

Experiments made with groups of pigs consisting of five subjects in each case have proved that pigs fed with with feed containing fish flour and another feed containing the formula Pronit and urea as a substitute increased practically the same amount in weight; but when the latter pigs were slaughtered, it was observed that the flesh was finer and less fibrous and that there were no lesions of any kind in the internal organs of the animals, which demonstrates that diets having a Pronit and urea base, contrary to assertions and the prohibitions on the use thereof at present, can fully replace animal protein meals, such as fish meal, meat meal, and blood meal.

Animals fed with the new product gained in 81 days 19.500 kg. more than the control batches; the index of consumption per kg. of meat produced was 3.600 kg., against 4.100 kg. for the control batch, even with the drawback of the existence in the group fed with Pronit of immature females, which undoubtedly disturbed the pigs in a manner disadvantageous to the result. Moreover, killing having been carried out, the pigs fed with Pronit were given a better grading at the slaughter house than the control pigs, the flesh of the former being prime and regarded as finer. Likewise, it was possible to show larger hams, larger loins, less fat and approximately 600 grams less waste. Veterinary examination as to the condition of our animals gave optimum results, there being no renal lesions or lesions of any other organ.

The following conclusions may be drawn:

First: Total elimination of the animal proteins which were absolutely essential in the monogastrics, because of the amount and proportionality of the amino acids.

Second: It is unnecessary to prepare food rations perfectly balanced as regards the amount and nature of the amino acids, for the best utilization of the food rations by the animals.

Third: Extraordinary economy in the protein sources.

Fourth: Improvement of the animal metabolism, since as it is this which synthesizes the amino acids starting from the simple element nitrogen, the function of the animal of adaptation is exicted to the maximum, resulting in undoubted improvements in the breeds, it being unnecessary for man to study the protein proportions in each case. Adaptation by the animal will effect the task. This is the case with poultry, for which man must constantly modify the protein content of the diet as regards its appropriate content of proteins, according to whether it is a question of growth, fattening or laying. With the new product, this is not necessary, since the poultry are enabled, at each stage of their growth, to synthesize continuously the proteins or rather the amino acids which they require.

Fifth: With Pronit, it is possible to utilize industrial by-products of low quality not utilized up to the present time because of their cellulose content since with Pronit, this material is digestible up to some 25 to 30%.

The improvement in the animal metabolism was noted by the fact that animals fed with Pronit ate in half the time taken by those in the control batches, had a greater desire for nourishment, were not prostrated by the lethargy of digestion, did not show a transitory increase in the volume of the belly, and had a much better coat and appearance than their fellows in the control batch. This fact was apparent from the beginning to the end of the experiments.

What is claimed is:

1. Method for the preparation of a feed additive for monogastric animals comprising the steps of isolating from the contents of the rumen and reticulum of the gastrict system of ruminants the living microorganisms present therein, culturing said microorganisms to obtain a living culture thereof, and adding to said culture an amount of a lactic ferment sufficient to protect said microorganisms against the degree of acidity prevalent in the gastric system of a monogastric animal.

2. Method for protecting and promoting the growth of living microorganisms isolated from the rumen and reticulum of the gastric system of ruminants within a medium having a pH between about 4.5 and about 5.0, which comprises admixing with a culture of said microorganisms an amount of a lactic ferment sufficient to insure continued growth thereof at said pH range.

3. The method of claim 1 in which the lactic ferment comprises acidophile bacilli which are resistant and capable of growth at a pH between about 4.5 and about 5.0.

4. Method for the preparation of a feed additive for monogastric animals which will enable such animals to digest cellulosic feed ingredients, comprising the steps of removing the contents of the rumen and reticulum of the gastric system of a ruminant, isolating from said contents a portion of the microorganisms present therein in live form, culturing said portion to yield live microorganisms in more concentrated form, drying the remainder of the contents, adding to the microorganism concentrate a lactic ferment in an amount sufficient to insure continued growth of said microorganisms at a pH between about 4.5 and about 5.0, and admixing said microorganisms, lactic ferment, dried contents, together with yeast and mineral nutrients, to form said additive.

5. Method for the preparation of a feed additive for monogastric animals comprising the steps of removing the contents of the rumen and reticulum of the gastric system of a ruminant containing live rumen microorganisms, culturing said contents to promote continued growth of said microorganisms, inoculating a cluture broth with a small amount of said rumen content culture and growing said microorganisms further under anaerobic conditions to yield them in more concentrated form, dividing the remainder of said rumen content culture into three portions, drying a first portion to a moisture content of about 10% to 12% under vacuum, drying a second portion at atmospheric pressure at a temperature between about 50° and about 57° C., and drying a third portion at about 70° C., admixing said dried portions and said microorganism concentrate, and adding to said mixture a lactic ferment in an amount sufficient to insure continued growth of said microorganisms at the pH of the gastric system of the monogastric animal.

6. The method of claim 5 in which the lactic ferment comprises acidophile bacilli which are resistant and capable of growth at acidity conditions which prevail in the gastric system of the monogastric animal.

7. The method of claim 5 in which the rumen contents culture is carried out at a pH between about 6.8 and 7.2.

8. The method of claim 5 in which there is incorporated yeast and mineral nutrients.

9. The method of claim 5 in which there is incorporated placental material.

10. A feed additive for monogastric animals including as its active ingredients live microorganisms from the rumen and reticulum of the gastric system of a ruminant and an amount of a lactic ferment resistant to and capable of growth under acidity conditions prevailing in the gastric system of the monogastric animal sufficient to insure continued growth of said microorganisms in the gastric system of the monogastric animal and which includes placental material.

11. A feed additive for monogastric animals comprising from about 5% to about 50% by weight of live microorganisms from the rumen and reticulum of the gastric system of a ruminant, from about 1% to about 10% by weight of a lactic ferment resistant to and capable of growth under acidity conditions prevailing in the gastric system of the monogastric animal, yeast from about 49% to about 94% balance mineral nutrients.

12. A feed concentrate for monogastric animals comprising the additive of claim 11 in combination with a vegetable protein material.

13. A feed composition for monogastric animals comprising the additive of claim 11 in combination with a vegetable protein and a cellulosic feed ingredient.

References Cited by the Examiner

UNITED STATES PATENTS

| | | | |
|---|---|---|---|
| 2,235,613 | 3/1941 | Grelch | 99—9 |
| 2,560,830 | 7/1951 | Turner et al. | 99—9 X |
| 2,700,611 | 1/1955 | Jeffreys | 99—2 |

OTHER REFERENCES

Chem. Abst., vol. 52, 11213a (1958).

Doetsch et al.: Journal of Dairy Science, vol. 36, p. 828, 1953.

A. LOUIS MONACELL, *Primary Examiner.*

D. J. DONOVAN, *Assistant Examiner.*